Dec. 22, 1942.  A. KELLER  2,305,715
VEHICLE BODY
Filed Nov. 21, 1938  4 Sheets-Sheet 1
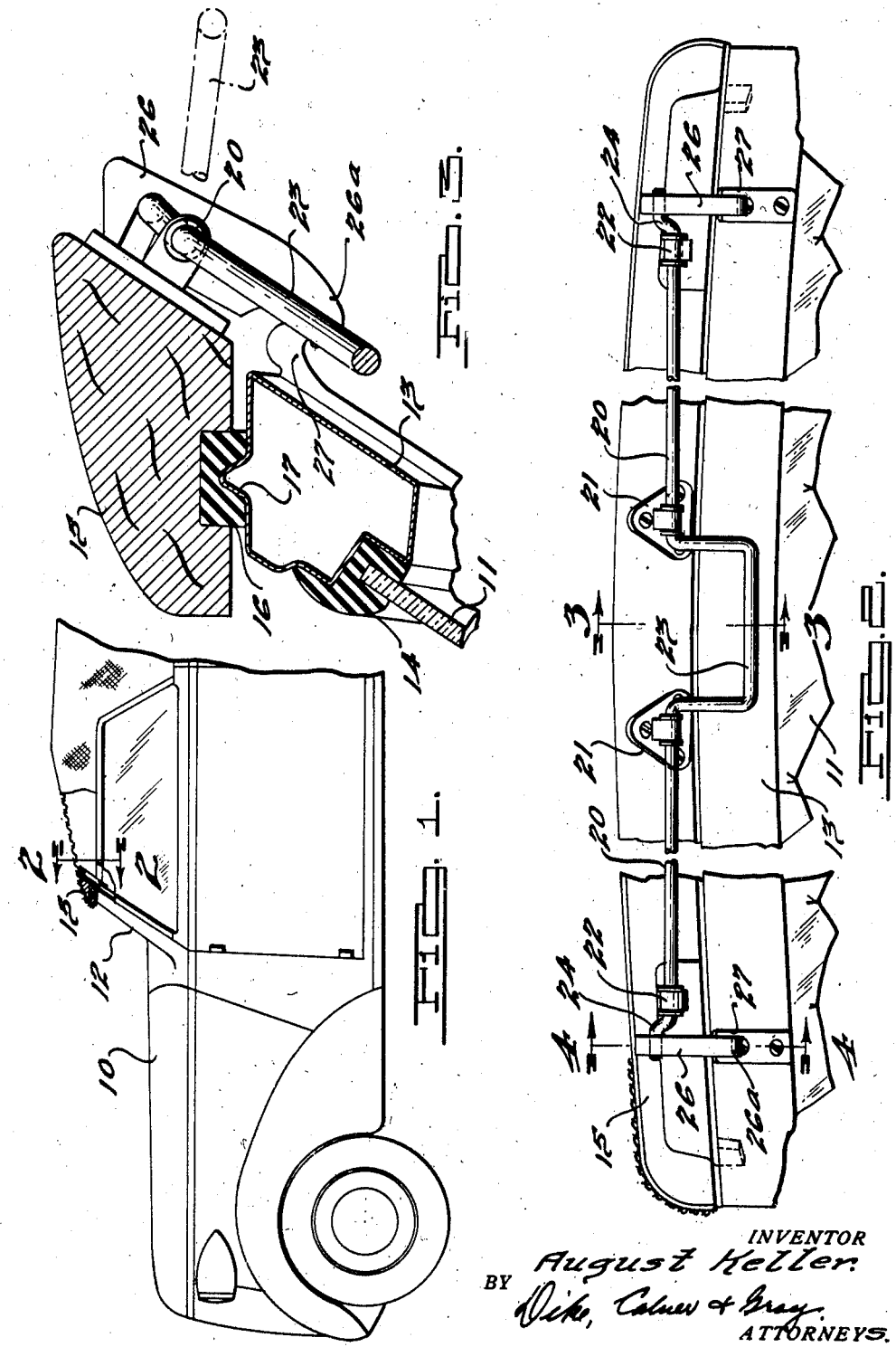
INVENTOR
August Keller
BY
Dike, Calver & Gray
ATTORNEYS.

Dec. 22, 1942.    A. KELLER    2,305,715
VEHICLE BODY
Filed Nov. 21, 1938    4 Sheets-Sheet 2
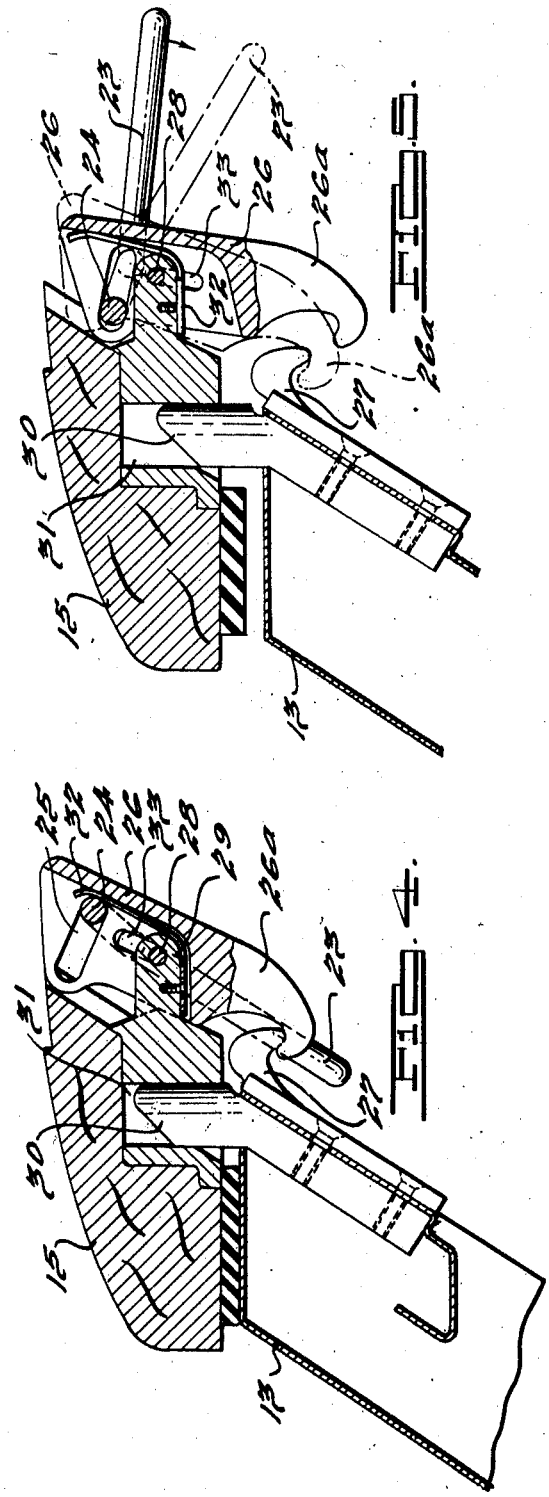
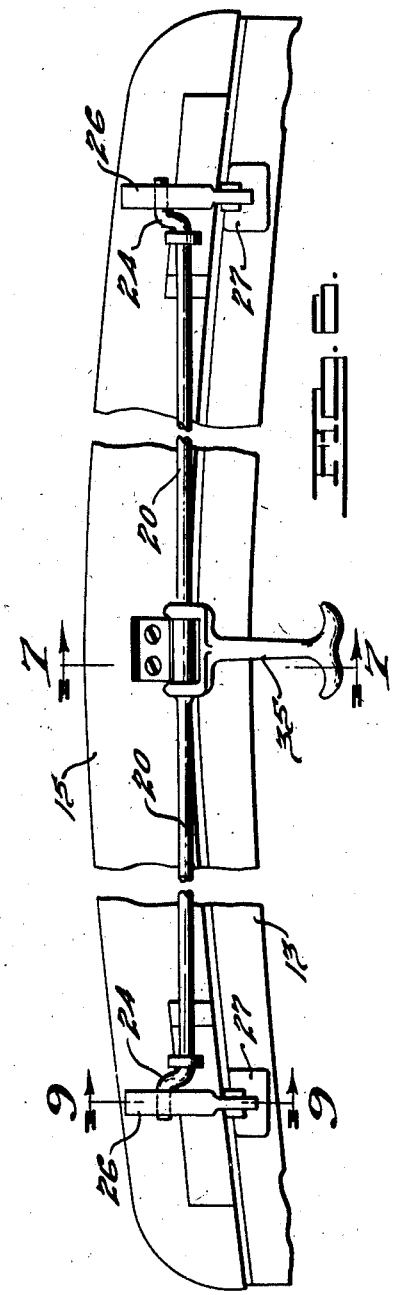
INVENTOR
August Keller.
BY Dike, Calver & Gray
ATTORNEYS.

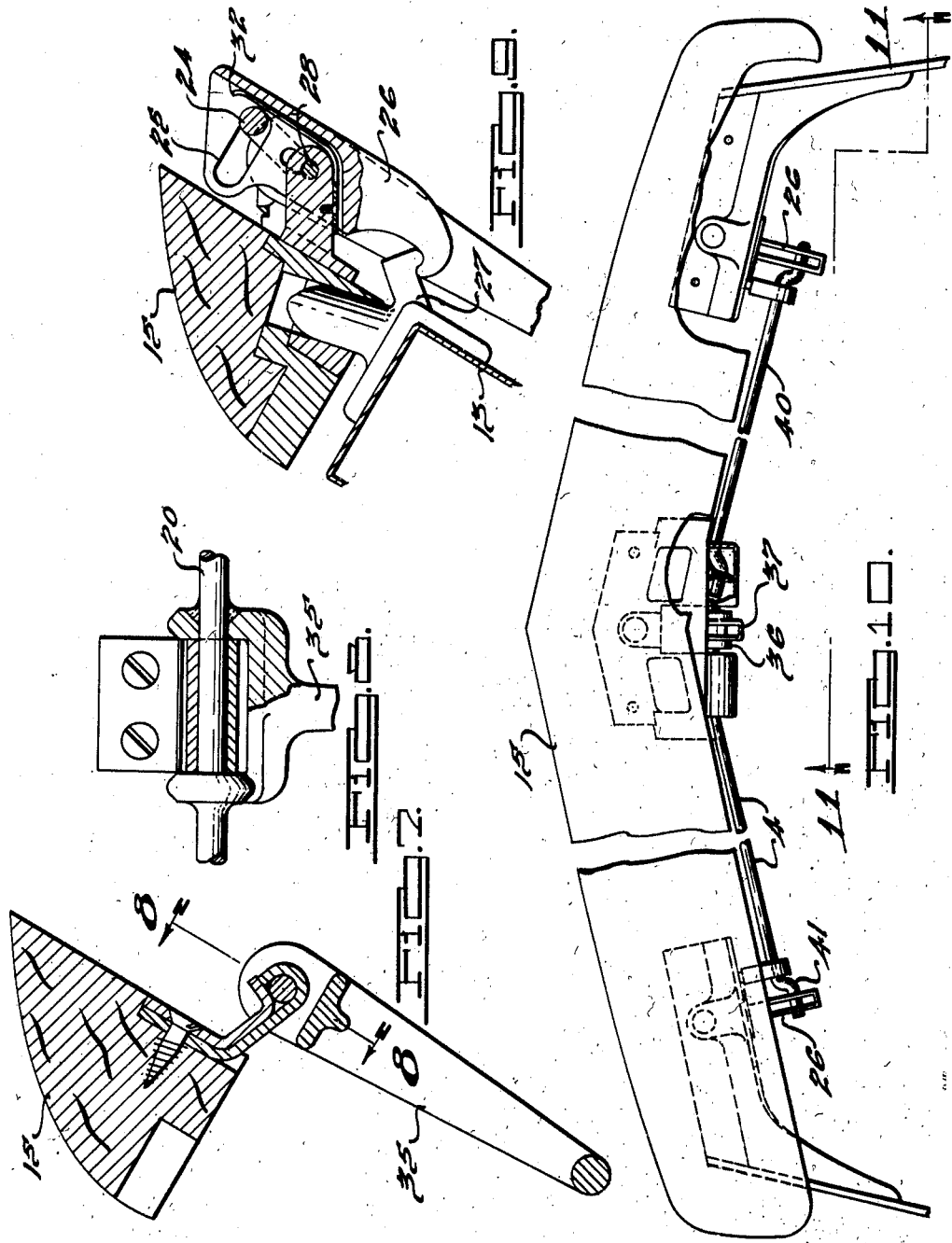

Dec. 22, 1942.　　　A. KELLER　　　2,305,715
VEHICLE BODY
Filed Nov. 21, 1938　　　4 Sheets-Sheet 4
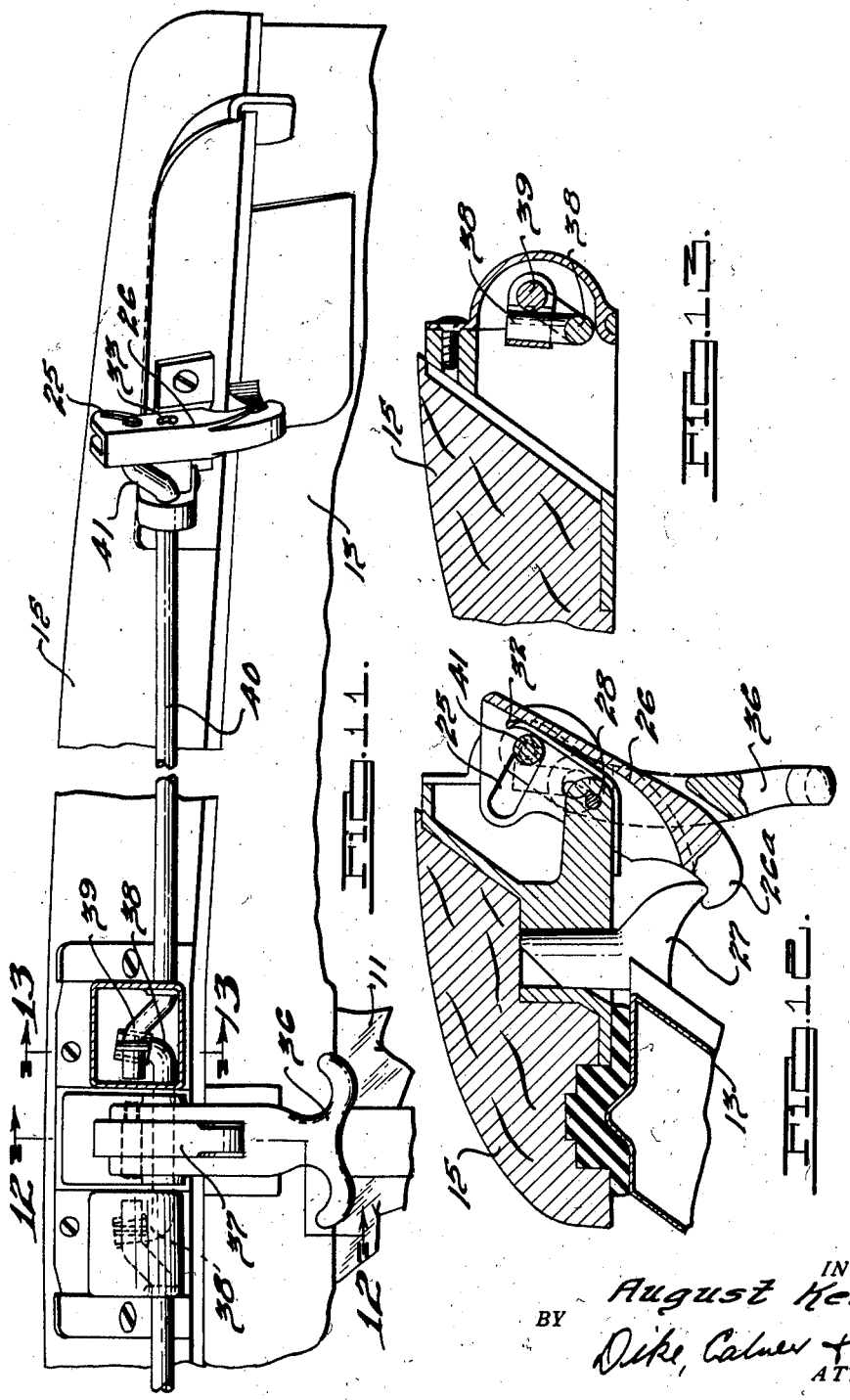
INVENTOR
August Keller
BY
Dike, Calver & Gray
ATTORNEYS.

Patented Dec. 22, 1942

2,305,715

UNITED STATES PATENT OFFICE 2,305,715

VEHICLE BODY

August Keller, Dearborn, Mich., assignor to Motor State Products Company, Ypsilanti, Mich., a corporation of Michigan Application November 21, 1938, Serial No. 241,507

1 Claim. (Cl. 296—120)

This invention relates to motor vehicle bodies and more particularly to vehicle bodies of the convertible type.

Heretofore great difficulties have been experienced with the bodies of this type and particularly with the devices for locking collapsible or foldable tops thereof to the rigid body structure.

Prior to the present invention the devices for locking a collapsible top to the body consisted of spaced wing or thumb screws or spaced top lock clamps which required the operator to move from one side of the car to the other side to unfasten the separate locking devices before the top could be folded or to fasten the separate locking devices after the top had been raised.

It is, therefore, one of the objects of the present invention to provide an improved locking device for positively locking and unlocking the collapsible top of a vehicle body to the front thereof and in which a plurality of spaced locking devices are simultaneously actuated in a simplified manner.

Another object of the invention is to provide a device of the above specified character which can be operated from the driver's seat and without leaving the same, and which can be locked and unlocked quickly and by an effort simply applied.

Another object of the invention is to provide a locking device in which a plurality of separate latch members are operated with a single control device.

Another object of the invention is to provide a locking device for a convertible top, which, when the top is moved to a raised position, provides a plurality of spaced locking devices which snap automatically into place and thereby provide an automatic connection between the top and the vehicle, which connection may thereafter be utilized to complete the locking of the top to the vehicle.

A further object of the invention is to provide a locking and clamping device operated by a mono-control handle to clamp the weather seal between the top header and the windshield, thus providing a weather-tight sealed connection between the header bar of the top and the body.

It is an added object of the invention to provide an improved device of the foregoing character which is simple in construction, dependable in operation and relatively inexpensive to manufacture.

Other objects and advantages of this invention will appear in the following description and appended claim, reference being had to the accompanying drawings forming a part of this specification wherein like reference characters designate corresponding parts in the several views.

Fig. 1 is a side view of the front part of a motor vehicle having a body of the convertible type embodying the present invention.

Fig. 2 is a view taken in the direction of the arrows on the top locking means from the plane passing approximately through the line 2—2 of Fig. 1.

Fig. 3 is a fragmentary sectional view taken in the direction of the arrows, the section plane being passed approximately through the line 3—3 of Fig. 2.

Fig. 4 is a fragmentary sectional view in the direction of the arrows, the section plane being passed substantially through the line 4—4 of Fig. 2, the view showing the latch in its locked position.

Fig. 5 is a view similar in part to Fig. 4, the latch being shown in its unlocked position.

Fig. 6 is a view similar in part to Fig. 2 and showing a modified construction embodying the present invention.

Fig. 7 is a sectional view taken in the direction of the arrows, the section plane being passed approximately through the line 7—7 of Fig. 6.

Fig. 8 is a fragmentary sectional view in the direction of the arrows, the section plane being passed approximately thruogh the line 8—8 of Fig. 7.

Fig. 9 is a fragmentary sectional view taken in the direction of the arrows, the secton plane being passed substantially through the line 9—9 of Fig. 6.

Fig. 10 is a plan view illustrating a body structure including a wndshield of the V-type and embodying the present invention.

Fig. 11 is a view illustrating the locking means of the structure illustrated in Fig. 10, presuming that the observer is looking forward from the driver's seat of the car, which is to say, in the direction of the arrows approximately from the line 11—11 of Fig. 10.

Fig. 12 is a fragmentary sectional view taken in the direction of the arrows, the section plane being passed approximately through the line 12—12 of Fig. 11.

Fig. 13 is a fragmentary sectional view taken in the direction of the arrows, the section plane being passed approximately through the line 13—13 of Fig. 11.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a motor vehicle having a body of the convertible type embodying the present invention. Referring to the drawings and more particularly to Fig. 1, the numeral 10 indicates the motor vehicle having a windshield 11 arranged between two windshield posts 12 rigidly secured to the body of the vehicle at the sides thereof, as illustrated. Between the posts 12 there is arranged a transverse member 13 preferably of a hollow construction. A rubber strip 14 is provided between the windshield 11 and the transverse member 13 to seal the same and prevent rattling.

The body is of the so-called convertible type, that is, having a collapsible or foldable top which may be folded toward the rear of the car, opening the body from the top. In accordance with the invention means are provided whereby the front of the collapsible type top may be fastened quickly and securely to said transverse member 13, thereby rigidly connecting said top to the body structure. A transverse top header 15 made of steel or wood is securely fastened along the front of the top.

The locking means comprise, generally, latch members carried by the top and operable from the driver's seat, whereby the top header 15 may be locked securely to the transverse member 13. For the purpose of providing a water and draft-tight seal between said transverse members, there is provided a rubber strip 16 carried by said member 15 and having a groove adapted to cooperate with a raised bead 17 provided on the transverse member 13.

The locking device comprises a cross bar 20 secured to the top header 15, middle brackets 21 and side brackets 22. The bar 20 is journalled in said brackets and adapted to rotate therein. The cross bar 20 is bent in its middle to provide a handle 23 with the aid of which the bar 20 may be turned or rotated manually from the driver's seat. The ends of the cross bar 20 are bent as shown in Fig. 2 to provide cranks 24 working in slots 25 provided in hook-shaped latches 26.

Since similar latch mechanisms are provided on both sides of the transverse members, only one of said mechanisms will be described in detail, it being distinctly understood that for each and every part described in one of said mechanisms there is a corresponding similar part provided in the mechanism arranged on the opposite side.

The latch member comprises an elongated body having a hook-shaped end 26a adapted to engage a hook 27 secured to the transverse member 13. Said elongated body of the latch 26 has a slot extending longitudinally thereof, which slot cooperates with a hinge pin 28 carried by a bracket 29 secured to the transverse member 15. Opposite the windshield hook 27 there is secured to the transverse member 13 a guiding dowel pin 30 adapted to enter into a vertically extending hole 31 provided in the transverse member 15. The purpose of said dowel pin and hole is to provide guiding means for moving the member 15 downwardly and to provide a positive connection between the transverse members 13 and 15 in horizontal directions, while said latch or locking device provides a positive vertical connection between said transverse members. A spring 32 is secured to the bracket 29 and bears upon the latch 26, thereby assisting in the locking operation thereof. From an examination of the drawings, it will be understood that the latch 26 is a member which is adapted in operation to move along a path which is a path resulting from the combination of two movements, namely, rotation of the latch around the pin 28 and longitudinal movement of the latch and pin 28 which is permitted by the longitudinally extending slot 33.

Referring to Figs. 4 and 5, it can be seen that when the header 15 is brought over the member 13 and the guiding dowel pin 30 engages the hole 31 and is moved manually down for some distance, the handle 23 is raised. As the handle 23 is moved downwardly in the direction of the arrows to lock the transverse member 15 to the member 13, the crank 24 rotates in the clockwise direction raising the latch in a vertical direction, which is permitted by the slot 33, and at the same time rotating the entire latch 26 in the clockwise direction around the pin 28 which thus constitutes a movable center of rotation. Because of such a movement, the latch 26 not only rotates around the pin 28 but also moves forward and therefore it first occupies a position for engaging the windshield hook 27 and then moves upwardly to engage the same. Continued downward movement of the handle 23 operates to move the latch 26 still further upward and therefore to draw the top header 15 still more tightly onto the member 13, thereby compressing the weather seal and effecting a weather-tight engagement of the header 15 and the member 13.

The structure illustrated in Fig. 6 is substantially similar to the above described structure, the differences being chiefly in the provision of a handle 35 of a more convenient design. The operation of the modified structure is similar in its plan to that of the above described structure, although there is provided in this construction a number of minor improvements in the construction of operative parts, which improvements are self-evident from an examination of the drawings.

In Fig. 10 there is illustrated a modified construction of the locking device which is adapted for a windshield of the V-type in connection with which an integral cross bar cannot be used. In this structure the handle 36 is arranged in a central bracket 37, and has two rotating fingers 38 engaging the cranks 39 provided on bar sections 40 suitably supported and engaging latch members 26 with the aid of cranks 41 similar to the cranks 24 of the cross bar 20. In its other features this structure is substantially similar to the structure illustrated in Figs. 1 to 5, inclusive, except that the center latch, as well as the side latches, is operated in the same manner by movement of the handle.

From the foregoing it will be seen that the present invention provides a latching or locking device in which a plurality of spaced latching members are actuated from a single control handle to lock or unlock a pair of relatively movable parts. In the embodiment of the invention here shown by way of example but not of limitation, the device is applied to the movable top header bar of a collapsible top used in motor vehicle construction and is carried by the movable header bar. It is to be understood, however, that the device may be used for various other purposes within the scope of the present invention, such, for example, as for locking the movable motor hood or bonnet. In general, the device of the present invention may be used wherever a latching device is desired which is capable of engaging and clamping a plurality of members at least one of which is movable relative to the other. The clamping device of the present invention may be carried by the movable part, as here shown, or may be attached to the fixed part, as desired.

I claim:

In a vehicle body having a windshield, two windshield posts between which said windshield is arranged, a transverse windshield header member connected to said posts, a collapsible top having a front edge adapted to come in contact with said windshield header member, spaced abutments on said header projecting into and located entirely within the vehicle body, a device for locking said edge to said member, said device including hook-shaped latches adapted to engage said abutments and having a slot extending longitudinally thereof, a hinge pin carried on said edge and adapted to move in said slot, manually operable means imparting rotating movement to each of said latches causing the same to move simultaneously on said pin.

AUGUST KELLER.